(12) United States Patent
Roger et al.

(10) Patent No.: US 7,043,755 B1
(45) Date of Patent: May 9, 2006

(54) METHOD AND DEVICE FOR MODEL RESOLUTION AND ITS USE FOR DETECTING ATTACKS AGAINST COMPUTER SYSTEMS

(75) Inventors: Muriel Roger, Paris (FR); Jean Goubault-Larrecq, Clichy (FR)

(73) Assignees: BULL S.A., Louveciennes (FR); INRIA, LeChesnay (FR)

( * ) Notice: Subject to any disclaimer, the term of this patent is extended or adjusted under 35 U.S.C. 154(b) by 936 days.

(21) Appl. No.: 09/661,448

(22) Filed: Sep. 13, 2000

(30) Foreign Application Priority Data

Sep. 13, 1999 (FR) .................................. 99 11716

(51) Int. Cl.
*G06F 11/30* (2006.01)

(52) U.S. Cl. ........................ 726/22; 713/200; 713/201; 713/202; 707/1; 707/3; 707/4

(58) Field of Classification Search ................ 713/200, 713/201, 202; 707/1, 3, 4
See application file for complete search history.

(56) References Cited

U.S. PATENT DOCUMENTS

| | | | | |
|---|---|---|---|---|
| 5,355,474 A | * | 10/1994 | Thuraisngham et al. | ........ 707/9 |
| 5,481,650 A | * | 1/1996 | Cohen | .......................... 706/12 |
| 5,557,742 A | * | 9/1996 | Smaha et al. | ................ 713/200 |
| 5,694,590 A | | 12/1997 | Thuraisingham et al. | |

FOREIGN PATENT DOCUMENTS

FR   2706652 A   12/1994

OTHER PUBLICATIONS

Schoning, Uwe; Logic for Computer Scientists; 1989; Birkhauser Boston; pp. 1-39, 109-154.*

(Continued)

*Primary Examiner*—Gilberto Barron, Jr.
*Assistant Examiner*—Jung W Kim
(74) *Attorney, Agent, or Firm*—Miles & Stockbridge P.C.; Edward J. Kondracki

(57) ABSTRACT

The present invention relates to a method and device for model resolution and its use for detecting attacks against computer systems. The device comprises adapter software for translating the information from the log file, formulated in the specific language of the machine, into a language understandable by the interpreter, an interpreter receiving the information from the adapter and receiving the formulation of the specification in the temporal logic in a specification formula in order to expand this formula and fill in the table and the stack of worked subformulas described above resulting from the scanning of the machine's log file, and a clause processing algorithm for resolving the Horn clauses using the information from the table and the stack of worked subformulas, this clause processing algorithm generating an output file or generating an action.

15 Claims, 2 Drawing Sheets

| | $f_2$ | $f_3$ | $f_7$ | $f_8$ | $f_{11}$ |
|---|---|---|---|---|---|
| $f_1$ | • | • | | | |
| $f_3$ | | | • | | |
| $f_7$ | | | | • | |
| $f_7$ | | | | | • |

| 2 | 2 | 2 | 1 | 0 |
|---|---|---|---|---|
| 1 | 1 | 0 | 0 | 0 |
| 1 | 0 | 0 | 0 | 0 |
| 1 | 1 | 1 | 1 | 1 |

| $f_8$ | $f_7$ | $f_3$ | | |
|---|---|---|---|---|
| $f_2$ | $f_2$ | $f_2$ | $f_2$ | $f_1$ |

OTHER PUBLICATIONS

Cormen et al.; Introduction to Algorithms; 1990; McGraw-Hill Book Company; pp. 219-243, 465-497.*

Terran Lane, Carla E. Brodley: "Sequence matching and learning in anomaly detection for computer security" AAAI Workshop: AI Approaches to Fraud Detection and Risk Management, XP002142494 Purdue Univ., West Lafayette.

R.J. Hayton, J.M. Bacon, K. Moody: "Access Control in an open distributed environment" Security and Privacy, 1998, Proceedings 1998 IEEE Symposium XP002142495.

Ghica Van Emde Boas-Lubsen, Peter Van Emde Boas: "Compiling Horn-claude rules in IBM's Business System 12 and early experiment in declarativeness" 1998 Silver Jubilee SOFSEM Meeting, XP002142496, Slovakia.

* cited by examiner

METHOD AND DEVICE FOR MODEL RESOLUTION AND ITS USE FOR DETECTING ATTACKS AGAINST COMPUTER SYSTEMS

FIELD OF THE INVENTION

The present invention relates to a method and device for model resolution and its use for detecting attacks against computer systems.

BACKGROUND OF THE INVENTION

Secure computer systems can be subject to attacks or attempts at fraudulent entry. In general, one tries to ward off these attacks by establishing log files, for example system log files or network log files, and by running scans on these files for detecting a malfunction or an intrusion. The systems that perform the auditing of log files generally rely on a complicated method that poses problems in the writing, and moreover, the resulting audit is difficult to read. Furthermore, when the intrusion occurs in several successive non-concomitant stages, the system may very well not detect it. In addition, the writing of the audit conditions is not very flexible, not very modifiable, and poses modularity problems. Thus, in most rule-based systems, it is necessary to describe the audit conditions in the form of programs describing the activation of rules conditioned by events; for example, in order to describe an audit condition that specifies a step A, followed a short time later by B, followed a short time later by c, it is necessary to describe queuing rules for step A, which if successful must activate queuing rules for step B, which if successful must activate queuing rules for step C. This way of writing the sequence A, B, C is tedious, and results in errors that are hard to detect with a simple reading. Furthermore, certain known systems require the log files to be scanned several times.

SUMMARY OF THE INVENTION

One object of the invention is to offer a high-performance specification resolution method.

This object is achieved through the fact that the high-performance specification resolution method comprises:

a) a step for formulating the audit conditions one wishes to detect using specification formulas expressing fraudulent entry or attack patterns or even abnormal operations, this being non-limiting, to be verified by examining the records of the computer system's log file;

b) a step for expanding formulas into subformulas;

c) a step for scanning by an interpreter, which consists of generating, for each expanded formula in each record, Horn clauses to resolve in order to detect whether or not the formula is valid in this record, the Horn clauses expressing the implications resolvent of the subformulas for each record scanned, in positive clauses, i.e. counting only a positive literal, and in non-positive clauses, i.e. counting at least one negative literal, which negative literals form the negative part of the clause;

d) a step for storing the positive Horn clauses in a stack of worked subformulas, and a step for storing, in a table comprising a representation, the implicating subformula(s) constituting the negative part of the clause and the link with the implicated subformula(s) constituting the positive part of the clause, and storing in a counter the number of formulas or subformulas present in the negative part of the clause for each implicated subformula;

e) a step for resolving the table based on each positive clause encountered, so as to generate either an output file or an action of the computer system;

f) a step for iterating steps b) through e) until the scanning of all the records in the log file is complete.

Another object is to provide great flexibility.

This object is achieved through the fact that the method uses a temporal logic for the formulation of the specification.

According to another characteristic, the table is a matrix and is indexed in columns by the subscripts of the formulas appearing in the negative part of the Horn clauses, and the lines are the Horn clauses exactly.

According to another characteristic, the table is preferably represented in the form of a sparse matrix, the columns being represented by means of chained lists and the lines remaining implicit.

According to another characteristic, an optimization of the expansion of the formulas is obtained through a hash table in order to ensure that the same formula is not expanded more than once in each record.

According to another characteristic, the log file is scanned only once from beginning to end.

Another object is to offer a device that makes it possible to implement the method.

This object is achieved through the fact that the high-performance specification resolution device comprises:

an adapting means for translating the information from the log file formulated in the specific language of the machine into a language comprehensible to an interpreting means;

the interpreting means receiving the information from the adapter and receiving the formulation of the specification in the temporal logic in a specification formula in order to expand this formula and fill in the table and the stack of worked subformulas stored in a memory of the computer system and resulting from the scanning of the computer system's log file;

a clause processing algorithm executed by the computer system, which makes it possible to resolve the Horn clauses using the information from the table and the stack of worked subformulas, this clause processing algorithm generating an output file or generating an action.

BRIEF DESCRIPTION OF THE DRAWINGS

Other characteristics and advantages of the present invention will emerge more clearly through the reading of the following description, given in reference to the attached drawings, in which.

DESCRIPTION OF THE PREFERRED EMBODIMENTS

Figure 1:
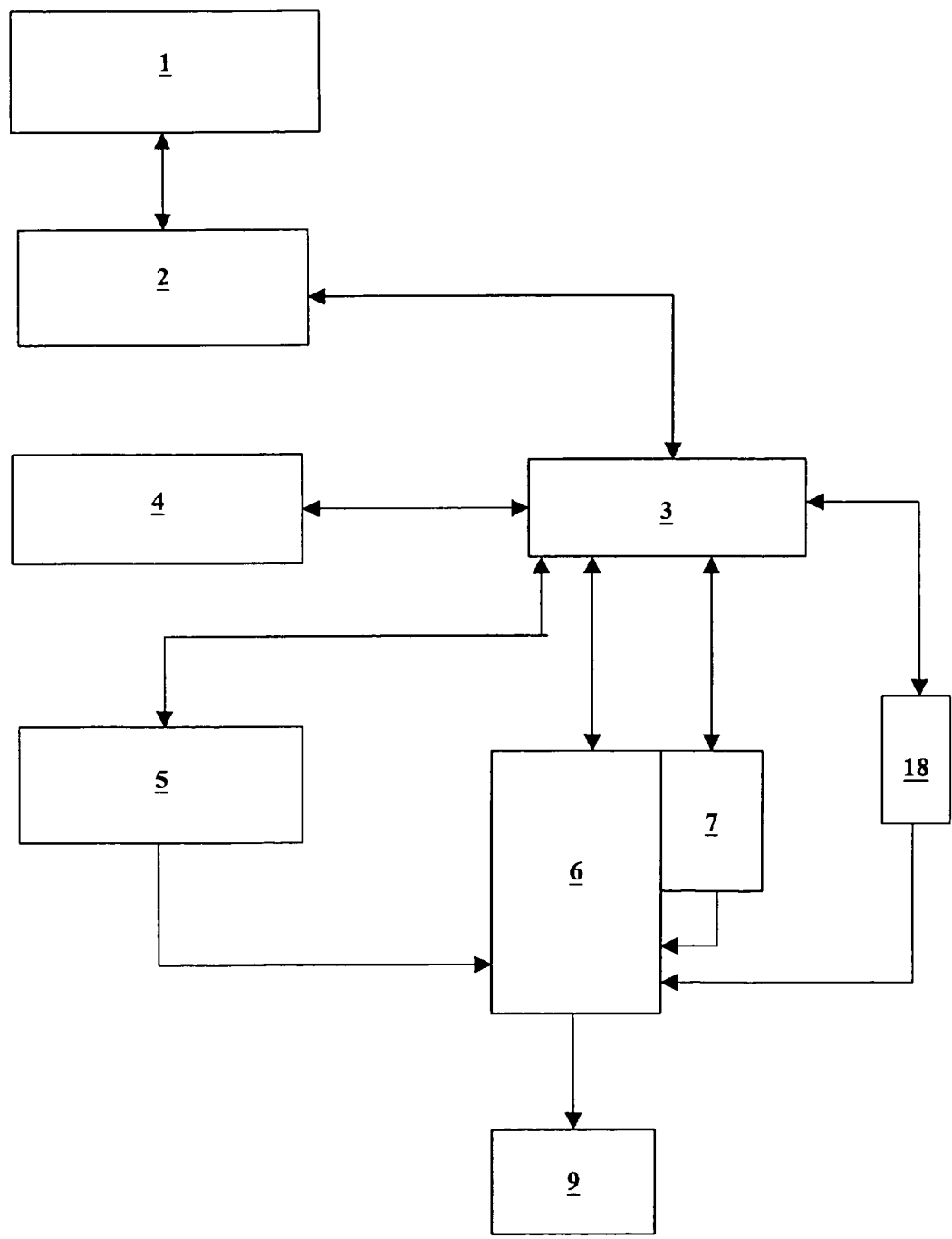
FIG. 1 represents a schematic view of the hardware and software elements that make it possible to implement the method.

FIG. 1 represents the elements required to implement the method according to the invention. The log file (1) is generally present in all the machines and can be the network log file when the machine is connected to a network, or a system log file, or any other file in which one wishes to verify a specification. A machine is understood to mean a computer comprising storage means, means for reading and for executing a program, and means for interacting with a user (for example screen, keyboard, mouse) and means for connecting to the network. This file communicates with an adapter (2), which is a software program for translating the information contained in the log file and expressed in the specific language of the machine into a high-level language understandable by an interpreter (3). The interpreter (3) also receives from a module (4) the formula of the specification to be verified, expressed in a temporal logic. This interpreter (3) performs the expansion of the formula into subformulas and the scanning of each record Ei (Annex 2) of the log file (1) in order to generate, by means of this expansion and this scanning, a resulting table and stack expressing Horn clauses stored in a memory (5). The concept of a Horn clause is well known to one skilled in the art, and is described for example in Goubault-Larrecq, Jean and Mackie, Ian, "Proof Theory and Automated Deduction," published by Kluwer, 1996). This table and this stack are used by a clause processing algorithm (6), which receives a start order from the interpreter (3) once the latter has filled in the table (5) containing a table of counters (7) and a stack (18), after having scanned all the records Ei of the file. This algorithm will look for the resolution of the specification for all of the records. When the completed scan of the record file (1) is detected, the clause processing algorithm generates either an output file or an action of the system or the machine.

In an optimization of the method according to the invention, the phase for filling in the table (5) and the stack (18) and the phase for processing the clauses are performed concomitantly, so that the clause processing algorithm can generate the output file or the action of the system or the machine as soon as possible, and generally before the detection of the completed scan of the record file (1).

To provide a better understanding of the method implemented, the latter will be explained with the help of an example whose formulas appear in an annex at the end of the specification. First of all, a log file is a set of records E=E1, . . . EN), as represented in Annex 2. Each record Ei comprises a certain amount of information such as the date, the operation in question, the machine, a result, a subject, this list being non-limiting.

Thus, E1 indicates that the machine user has tried to connect but has failed.

To formulate a specification, as represented in Annex 1, that can be detected or resolved, a specification formula in a temporal logic is used. This formula is described according to the following formula production in the grammar of the BNF format well known to one skilled in the art (Aho, Alfred V., Sethi, Ravi and Ullman, Jeffrey D., *Compilers: Principles, Techniques and Tools*, Addison-Wesley, 1986):

formula::=atom
|formula ∧ formula
|formula ∨ formula
|formula U formula
|formual W formula
atom::=record
|(formula)
|¬ atom
|O atom, the next line exists and in the next line, atom is true
|Õ atom, if the next line exists, then in the next line, the atom is true
|◇ atom, there exists a line, either the current line or a subsequent line, the atom is true
|▯ atom, for all the lines starting with the current line, the atom is true The operators between formulas are the operator "∧" for expressing a logical "AND", "∨" for expressing a logical "OR", "U" for expressing the formulation "until", and "W" for expressing the formulation "waiting for", "O" for expressing the formulation "on the next line, which exists", "Õ" for expressing the formulation "on the next line, if it exists", "◇" for expressing the formulation "on the current line or on a subsequent line", for expressing the formulation "on the current line and on every subsequent line." This notation is well known to one skilled in the art, (see for example Manna, Zohar and Pnueli, Amir, *The Temporal Logic of Reactive and Concurrent Systems Specification*, Springer, 1992). Thus, the temporal formulation F=F1 W F2 allows for an easy formulation of a specification to be verified.

Let us assume that the operator has entered, by means of a man-machine interface (4) that allows the generation of a temporal formula, a temporal formula like the one appearing in Annex 1.

The interface (4) will translate this formula in Annex 1 into a temporal formula where F and H are atomic formulas in which F represents {op="connection", result="failed", etc.} and H represents {op="connection", result="success", etc. Furthermore, let us assume that the log file (1) contains the records E1 through E3 represented in Annex 2.

First, the interpreter (3) performs an expansion of the formula for each record E1, E2, E3, as represented in Annex 6, by generating subformulas for each record in order to deduce from them Horn clauses that express the logical implications that exist between a formula and its subformulas, and the possibility of satisfying the atomic formulas, as represented in Annex 6. Thus, for the record E1, the formula is expanded into the subformula F to which the clause $(f_2)$ corresponds, into the subformula ◇H to which the clause $(f_2) \land (f_3) \rightarrow (f_1)$ corresponds etc. The interpreter (3) includes an optimization procedure that makes it possible to eliminate the redundancies and the unnecessary steps from the table of Annex 6, and after optimization, the interpreter will retain only the clauses generated that correspond to the table of Annex 7. To facilitate the understanding of the table of Annex 7 or the table of Annex 6, the notation ◇H means: "There exists a line, either the current line of the record or a subsequent line, in which the formula H is verified"; in order to verify whether F∧ ◇H is true in the record E1, the pairs (formula, record), called configurations, are numbered; in the example, the pair (F∧ ◇H, E1) is numbered (1). The interpreter (3) expands the formula F∧ ◇H in the record E1 into the formulas F and ◇H. The pair (F, E1) is numbered $f_2$, the pair (◇H, E1) is numbered $f_3$, and the interpreter generates the clause $(f_2)^\wedge(f_3) \rightarrow (f_1)$ which expresses that if the configuration $f_2$ and the configuration $f_3$ are verified, then the configuration $f_1$ is verified, which means that F is verified in the record E1. O(◇H) means: "the next line of the record exists and in the next line ◇H is true," which corresponds to the configuration $f_6$ for the first record. The formula H ∨O(◇H) means "H is true or the next line of the record exists and in the next line, there exists a line, either the current line or a subsequent line, in which H is true," which corresponds to the configurations $(f_1)$ for the record E1, $(f_9)$ and $(f_{14})$ for the record E2 and $(f_{19})$, $(f_{23})$ and $(f_{28})$ for the record E3. The set of horn clauses appearing in the right-hand part of the table of Annex 7 is stored in the table (5), in the counter (7) and in the stack (18) represented in FIG.

Figure 2:
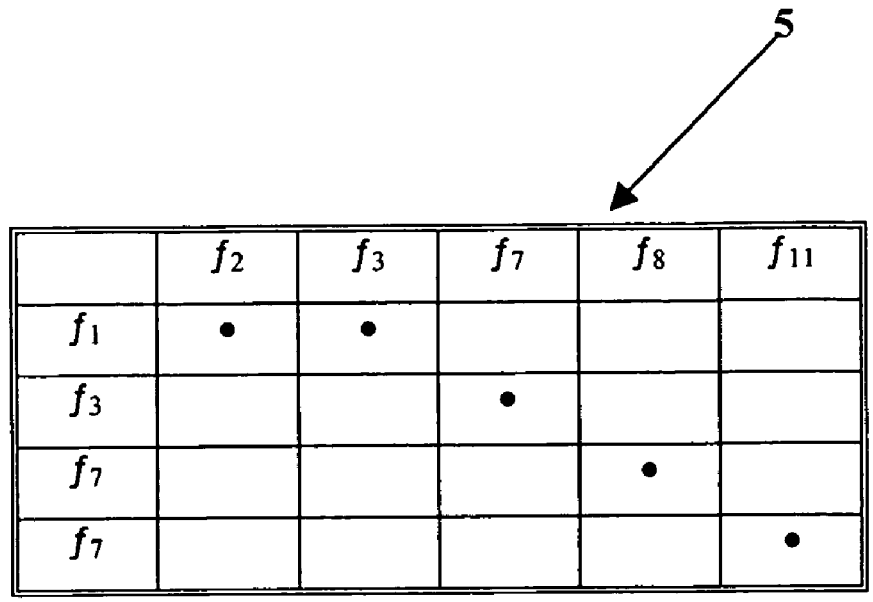
FIG. 2 represents the contents of the table, of the counters of the formulas or subformulas present in the negative parts of the clauses, and of the stack, and their evolution during the implementation of the method.
Figure 2:
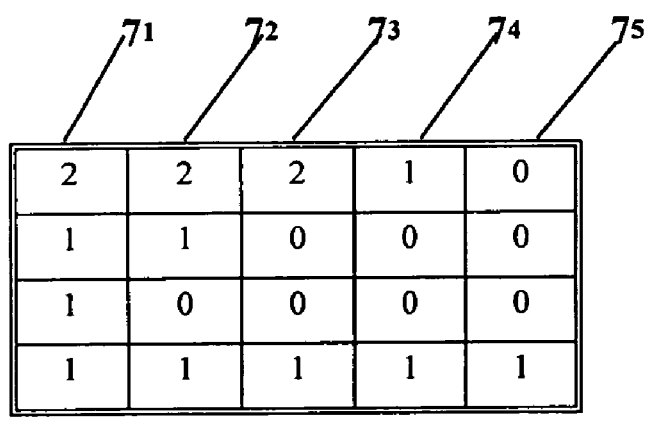
Figure 2:
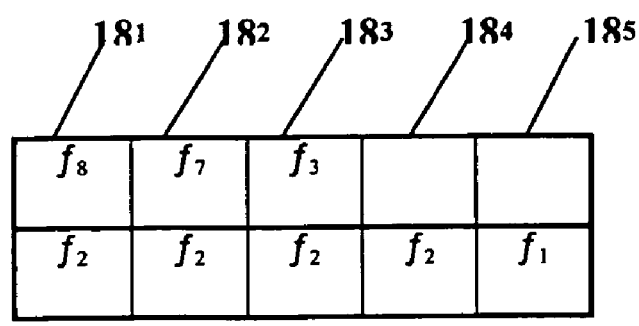

2, in the following way. The columns of the table (5) are indexed by the subscripts ($f_2$), ($f_3$), ($f_4$), ($f_5$), ($f_6$), ($f_8$), ($f_{11}$), ($f_{12}$) of the formulas appearing in the negative part of the clause. Only the subscripts that implicate a conclusion are saved. The lines of the table (5) are indexed by the subscripts ($f_1$), ($f_3$), ($f_7$) of the formulas appearing in the positive part of the clause. The negative part of the clause is the part located to the left of the implication arrow, which will hereinafter be called the implicating subformula(s). The positive part is to the right of the arrow and will be called the implicated formula. This representation is not limiting, and the representation in the form of a sparse matrix, the columns being represented by means of chained lists and the lines remaining implicit, is preferred. However, to provide a clear understanding of the invention, the latter will be explained using the notations of FIG. 2. To explain the notation of the table (7), the clause ($f_2$)∧($f_3$)→($f_1$) means that if the configuration $f_2$ is verified and the configuration $f_3$ is verified, then the configuration $f_1$ is verified. The clause $f_7$→$f_3$ means that if that the configuration $f_7$ is verified, then the configuration $f_3$ is too. Furthermore, during the expansion of the formulas by the interpreter (3), the latter stored in a stack (18) the positive clauses corresponding to the formulas that can be satisfied. Thus, at the end of the expansion, the formulas $f_2$ and $f_8$ are in the stack ($18_1$), as shown in FIG. 2, and the table of the counters of negative literals in the clauses of the table is constituted by the information represented by the reference ($7_1$) in this figure. In the resolution phase, the clause processing algorithm (6), when it is activated by the interpreter once the latter has filled in the tables (5, 7 and 18), after having examined the lines of the records in the log file, will begin by examining the top of the stack (18) and extracting from it the information that the configuration $f_8$, in this case, is satisfied. The algorithm then examines, in the table (5), the clauses that have this configuration in the negative part, in this case the configuration $f_7$, and deduces from them the counter that it must decrement. The counter ($7_2$) represents the evolution in the counter ($7_1$) of the counter that is associated with the formula represented in the positive part. The algorithm decrements the corresponding counter, in this case that of the configuration $f_7$, and places at the top of the stack the value "7" of the configuration that is true, as shown in the box ($18_2$), which represents the evolution of the stack (18), while the column ($7_2$) represents the evolution of the counter. Next, the clause resolution algorithm will proceed by iteration, searching for the clauses that have the configuration $f_7$ in the negative part in order to deduce from them that the configuration $f_3$ is true and decrement the counter corresponding to this line of configurations, as shown in the column ($7_3$). The algorithm (6) continues in this way until the stack (18) is empty or contains configurations already processed, and the only configuration $f_1$ that verifies the specification is obtained in the stack ($18_5$).

The expansion algorithm avoids unnecessarily replicating identical configurations, represented by their pointers, by establishing a hash table. The hash table data structure and the associated algorithms are well known to one skilled in the art, (see for example Knuth, Donald Erwin, *The Art of Computer Programming*, Vol. 3, "Sorting and Searching," Addison-Wesley, Second Edition, 1998).

Furthermore, it is also possible to achieve optimizations in the expansion of the formulas, in order to avoid several steps. Thus, instead of expanding the formula ◊F into F ∨O(◊F), then into F and O(◊F), and then into ◊F in the next state, it is expanded directly into F and into ◊F in the next state. Likewise, when there is a formula of the type F∧G where either F or G can be evaluated as false in the current state, the expansion of the formula is halted. The method developed by the invention has an advantage over the known method of the prior art, in which a truth table like the one represented in Annex 4 is first established for each atomic formula, then secondly, truth tables (Annex 5) are established for the non-atomic subformulas using the truth table of Annex 4. The model verification is then performed in two stages. First, it verifies whether the atomic formulas are true or false, which requires a scanning of the states for each formula, then secondly, in order to establish the truth of the subformulas, it is necessary to see how each atomic formula behaves in each state, which amounts to performing several scans of the records. This means performing backward returns in the log file with all the ensuing read and set operations which, given the large size of a log file, can be very time-consuming. The method developed by the invention is much more high-performance and economical, in terms of size and the memory required to store the intermediate states.

To provide a better understanding of the algorithm, we will describe it briefly, then present it formally.

The specification file, $F_s$, is considered to be a finite set of formulas $F_s$ whose syntax and semantics are defined above. Let us use the notation F for the set of all the formulas whose syntax and semantics are defined above, and ($R_1$, . . . , $R_{|N|}$)(with N equal to the number of records in the file) for the log files. Log files are files that record everything that happens in a system (for example, a file that traces the users' connections to and disconnections from the machines). A record is a function R with a finite domain and codomain from Σ* to Σ*, or the set of character strings $$R:\Sigma^* \to \Sigma^*$$

Let us use the notations dom(R) and codom(R), respectively, for the domain of R and the codomain of R.

Example 1 (record) Let us consider the record R of a log file:
Date=02:27:2000, operation=connection, machine=papillon,
result=success, subject=Machine
we then have: dom(R)={date, operation, machine, result, subject}
where dom(R) is the domain and codom is the codomain
codom(R)={02:27:2000, connection, papillon, success, Machine}, and
$R:\Sigma^* \to \Sigma^*$
date→02:27:2000
Operation→connection
machine→papillon
result→success
subject→Machine A log file is therefore a (finite) set of records $R_1$, . . . , $R_{|N|}$.

Let "Current" and "Next" be sets of formula representations (in the remainder of the description, "formula" will be used to mean "formula representation"); Current is the set of formulas to be examined in the current state and Next is the set of formulas that must be examined in the next state.

In each state, the set "Current" is the union of the set "Next" and the formulas $F_s$ associated with the current state. That is what step 2) of the algorithm says.

The current state is represented by the integer i; 1≤i≤|N|.

The "log" file is scanned in one pass, and during this scan, in each state, i.e. in each record of the file, the formulas of the set Current that are verified are revealed, and those that contain future operators are added to the set "Next" so they can be examined in the next state. That is what the "Expand"

procedure in step 3) of the algorithm does. This procedure extracts the subformulas from each formula recursively, stores the logical implications that concern them in the form of Horn clauses in a matrix M (for example, for a formula $F=F_1 \wedge F_2$, we have the clauses $F_1 \rightarrow F$ and $F_2 \rightarrow F$). and for those that are atomic, if they are verified in the current state (which is what the "match" procedure appearing in "Expand" looks for), it stores them in a stack (Stack), which is a stack of formula representations. Once all the formulas have been expanded in the current state, those that are resolvable are resolved with the help of the matrix and the stack (this is what the "resolve_matrix" procedure in step 4) of the algorithm does). Thus, as a result of the atomic formulas that have been resolved and the clauses, all the formulas that are verified are stored in the file "ResForm" (which is a set of formula representations).

These steps are iterated until the end of the "log" file (as seen in step 4) of the algorithm). Finally, when the entire log file has been scanned, the "Satis" procedure of step 5) compares the formulas of the file ResForm, which are all formulas verified in a certain state but which are subformulas of formulas of the specification file, to the formulas of the specification file, in order to see which ones are verified, and in which state(s).

Here is the algorithm itself:
1) $i=\emptyset$;
   Current:=$\emptyset$;
   Next:=$\emptyset$;
   ResForm:=$\emptyset$;
   Stack:=stack_empty;
   M=( );
2) Current:={Repr(F, i)/F $\in F_s$} $\cup$ Next;
   where Repr(F, i) is a stored representation of F in the i state
   Next:=$\emptyset$;
3) if Current $\neq \emptyset$ then:
   let f $\in$ Current;
   Current:=Current\{f};
   Expand(f);
4) resolve_matrix;
   if/<|N|
      then i:=i+1;
   go to 2);
   otherwise go to 5);
5) Satis;

We will now define the various procedures used in the algorithm.

"Expand(f)" procedure, where f is a formula representation.

For greater clarity, this procedure will be presented with the help of a table whose meaning will now be explained:
- the "Formula" column is exactly: form (f), i.e., the formula represented by f,
- the "Current" (or respectively, "Next") column designates all the formula representations that have been added to the "Current" (or respectively, "Next") set,
- the "Clause" column designates the clauses that are stored in the matrix with the insert_clause procedure described below;
- the formula representations added to the "Current" set are in turn expanded recursively;
- the atomic formulas and the formulas with the form $\neg F_1$, where $F_1$ is an atomic formula, are processed separately: if the atomic formula corresponds to the current record (match |record) (the "match" procedure is defined below), then this formula is verified in the i state; if the atomic formula $F_1$ does not match the current record, then $\neg F_1$ is verified in the i state. More formally:

If form(f) is an atomic formula,
  if match(f)=TRUE
  then Stack=Stack(Stack, f);
If form(f) has the form $\neg F_1$, $F_1$ being an atomic formula,
  let $f_1$=Repr($F_1$, i);
  if match($f_1$)=FALSE
  then Stack=Stack(Stack, f);

| Formula | Current | Next | Clause |
|---|---|---|---|
| $F_1 \wedge F_2$ | $f_1$ = Repr($F_1$, i) | | $f_1 \wedge f_2 \rightarrow f$ |
| | $f_2$ = Repr($F_2$, i) | | |
| $F_1 \vee F_2$ | $f_1$ = Repr($F_1$, i) | | $f_1 \rightarrow f$ |
| | $f_2$ = Repr($F_2$, i) | | $f_2 \rightarrow f$ |
| $OF_1$ | | $f_1$ = Repr($F_1$, i + 1) | $f_1 \rightarrow f$ |
| $OF_1$ | | $f_1$ = Repr($F_1$, i + 1) | $f_1 \rightarrow f$ |
| | | si i $\neq$ |N| (*) | |
| $\Diamond F_1$ | $f_1$ = Repr($F_1$, i) | $f_2$ = Repr($\Diamond F_1$, i + 1) | $f_1 \rightarrow f$ |
| | | | $f_2 \rightarrow f$ |
| $F_1$ | $f_1$ = Repr($F_1$, i) | $f_2$ = Repr($\Diamond F_1$, i + 1) | $f_1 \wedge f_2 \rightarrow f$ |
| $F_1 U F_2$ | $f_1$ = Repr($F_1 \wedge O(F_1 U F_2)$, i) | | $f_1 \rightarrow f$ |
| | $f_2$ = Repr($F_2$, i) | | $f_1 \rightarrow f$ |
| $F_1 W F_2$ | $f_1$ = Repr($F_1$, i) | | $f_1 \rightarrow f$ |
| | $f_2$ = Repr($F_1 U F_2$, i) | | $f_2 \rightarrow f$ |
| $\neg(F_2 \wedge F_3)$ | $f_1$ = Repr($\neg F_2 \vee \neg F_3$, i) | | $f_1 \rightarrow f$ |
| $\neg(F_2 \vee F_3)$ | $f_1$ = Repr($\neg F_2 \wedge \neg F_3$, i) | | $f_1 \rightarrow f$ |
| $\neg(\neg F_2)$ | $f_1$ = Repr($F_2$, i) | | $f_1 \rightarrow f$ |
| $\neg(OF_2)$ | $f_1$ = Repr($O \neg F_2$, i) | | $f_1 \rightarrow f$ |
| $\neg(OF_2)$ | $f_1$ = Repr($O \neg F_2$, i) | | $f_1 \rightarrow f$ |
| $\neg(\Diamond F_2)$ | $f_1$ = Repr($\Box \neg F_2$, i) | | $f_1 \rightarrow f$ |
| $\neg(\Box F_2)$ | $f_1$ = Repr($\Diamond \neg F_2$, i) | | $f_1 \rightarrow f$ |
| $\neg(F_2 U F_3)$ | $f_1$ = Repr($\Box \neg F_3$, i) | | $f_1 \rightarrow f$ |
| | $f_2$ = Repr($\neg F_3 U (\neg F_2 \wedge \neg F_3)$, i) | | $f_2 \rightarrow f$ |
| $\neg(F_2 W F_3)$ | $F_1$ = Repr($(\neg F_3) U (\neg F_2 \wedge \neg F_3)$, i) | | $f_1 \rightarrow f$ |

*: otherwise, i.e. if i = |N|,
$f_1$ = Repr($F_1$, i)
Stack = Stack(Stack, $f_1$);

"match(f)" procedure, where f is a formula representation
In the case of form(f):
  if it has the form {$id_1=t_1, \ldots, id_n=t_n, \ldots$}, then:
    if $\forall j, 1 \leq j \leq n$, $id_j \in Dom(R_i)$, and match-term (Ri(idj), tj, f)
    then TRUE
    otherwise FALSE
  if it has the form {$id_1=t_1, \ldots, id_n=t_n, \ldots$}, then:
    if n=|domR$_i$| and j, $1 \leq j < n$, $id_j \in Dom(R_i)$,
    and match-term (Ri(idj), tj, f)
    then TRUE
    otherwise FALSE "match-term" procedure (w, t, f) where w, t $\in \Sigma^* \cup V$ and f is a formula
representation:
in the case of t:
  if t is a regex:
    if Reg (w, t)
    then TRUE
    otherwise FALSE
  if t is a variable x:
Notation: $\rho(x)$ is a partial function of the set of variables V to the set of character strings $\Sigma^*$ if ρ(x) is defined
  if ρ(x)=w
    then TRUE
    otherwise FALSE
  if ρ(x) is not defined, then
Notation: E is the environment constituted by the pairs whose first component is taken from the set of variables and whose second component is taken from the set of character strings
  E:=E ∪ {(x, w)};
  TRUE;
Insert-clause procedure (H), where H is a Horn clause having one or two formula representations in the negative part:
Notation: If M is a matrix m x n, m, n ∈ N, let $m_{i,f}$ be the element of the $i^{th}$ line indexed by f, and likewise $m_{f,i}$ and $m_{f1,f2}$
In the case of H:
  if H has the form $f_1 \rightarrow f$, then
    if there already exists a column of M indicated by $f_1$
      then add a line indexed by f with $m_{f,f1}=1$;
      otherwise, add a column indexed by f and a line indexed by $f_1$, with $m_{f,f1}=1$;
  if H has the form $f_1 \wedge f_2$, then:
    if neither $f_1$ nor $f_2$ is an index of any column of M
      then add 2 columns indexed by $f_1$ and $f_2$ and a line indexed by f with $m_{f,f1}=m_{f,f2}=2$
    if only one of the $f_i$, i=1,2 is not an index of a column of m, then:
      add a column indexed by $f_i$ and a line indexed by f with $m_{f,fi}=m_{f,fj}=2$, where j ∈ {1,2}\{i}
    if $f_1$ and $f_2$ are indexes of columns of M, then:
      add a line indexed by f with $m_{f,f1}=m_{f,f2}=2$
resolve-matrix procedure
if Stack=stack-empty, then nothing;
otherwise, let f:=pop(Stack); $\forall_i$ such that $m_{i,f}$ is the element that exists then:
  $m_{i,f}=m_{i,f}-1$;
  $\forall_j$ such that $m_{i,j}$ exists, then: $m_{i,j}:=m_{i,j}-1$
  if $m_{i,j}=0$, then;
  let $f_1$ be the index of the line $m_{i,f}$
  if $f_1 \notin$ Res-Form, then:
    Stack:=stack(Stack, $f_1$)
    Res-form:=Res-Form ∪ {$f_1$}
  dele ($m_{i,f}$);
  if the $i^{th}$ line, delete it; if the column indexed by f is empty, delete it
Satis:
If Stack≠stack-empty then:
let $f_1$=pop(Stack);
if $f_1 \in F_s$, then form(f) is verified in the state state(f)

It should be clear to those skilled in the art that the present invention allows embodiments in many other specific forms without going outside the field of application of the invention as claimed. Consequently, the present embodiments should be considered as examples, but can be modified in the field defined by the scope of the attached claims.

ANNEX

Annex 1
{op=<<connection>>, result =<<failed >>, ... }
and later {op=<<connection >>, result =<<success>>, ... }

Annex 2
E1: {op =<<connection >>, result =<<failed >>, subject =<<machine >>}
E2: {op=<<connection >>, result =<<success >>, subject =<<machine >>, date =<<09:14:99>>}
E3: {op=<<exec >>, result =<<success >>, object =<<emacs >>, mode =<<tex >>, subject =<<machine >>}

Annex 3
F ∧ ◊ H where F and H are atomic formulas for detecting events expressed in temporal logic from atomic formulas.
E1 {F}
E2: {H}
E3: {G}

Annex 4

| Truth tables of the atomic formulas | | |
|---|---|---|
| STATES | F | H |
| E1 | 1 | 0 |
| R2 | 0 | 1 |
| R3 | 0 | 0 |

Annex 5

| Truth tables of the non-atomic formulas | | |
|---|---|---|
| STATES | ◊ H | F ∧ ◊ H |
| E1 | 1 | 1 |
| E2 | 1 | 0 |
| E3 | 0 | 0 |

Annex 7

| STATES | Formulas et subformulas | | Clauses generated |
|---|---|---|---|
| E1 | F ∧ ◊ H | ($f_1$) | |
| | ($f_1$): F | ($f_2$) | ($f_2$) |
| | ◊ H | ($f_3$) | ($f_2$) ∧ ($f_3$)→($f_1$) |
| | ($f_3$) H | ($f_4$) | ($f_4$)→FALSE |
| E2 | F ∧ ◊ H | ($f_6$) | |
| | ($f_3$) ◊ H | ($f_7$) | ($f_7$)→($f_3$) |
| | ($f_7$) : H | ($f_8$) | ($f_8$) |
| | ($f_6$): F | ($f_9$) | ($f_6$)→($f_7$) |
| | | | ($f_6$)→FALSE |
| E3 | F ∧ ◊ H | ($f_{10}$) | |
| | ($f_7$) ◊ H | ($f_{11}$) | ($f_{11}$)→($f_7$) |
| | ($f_{11}$) : H | ($f_{12}$) | ($f_{12}$)→FALSE |
| | ($f_{10}$): F | ($f_{13}$) | ($f_{11}$)→FALSE |

Annex 6

| STATES | Formulas et subformulas | | Clauses generated |
|---|---|---|---|
| E1 | F ∧ ◊ H | ($f_1$) | |
| | ($f_1$): F | ($f_2$) | ($f_2$) |
| | ◊ H | ($f_3$) | ($f_2$) ∧ ($f_3$) → ($f_1$) |
| | ($f_3$): H V O (◊ H) | ($f_4$) | ($f_4$) → ($f_3$) |
| | ($f_4$): H | ($f_5$) | ($f_5$) →($f_4$) |

-continued

| STATES | Formulas et subformulas | | Clauses generated | |
|---|---|---|---|---|
| | | | $(f_5) \rightarrow$ FALSE | |
| | O ($\Diamond$ H) | $(f_6)$ | $(f_6) \rightarrow (f_4)$ | |
| E2 | F $\wedge$ $\Diamond$ H | $(f_7)$ | | |
| | $(f_6)$ ($\Diamond$ H) | $(f_8)$ | $(f_8) \rightarrow (f_6)$ | |
| | | | $(f_9) \rightarrow (f_8)$ | |
| | $(f_8)$: H V O ($\Diamond$ H) | $(f_9)$ | $(f_{10}) \rightarrow (f_9)$ | |
| | | | $(f_{10})$ | |
| | $(f_9)$: H | $(f_{10})$ | | |
| | | | $(f_{11}) \rightarrow (f_9)$ | |
| | | | $(f_{12}) \rightarrow$ FALSE | |
| | O ($\Diamond$ H) | $(f_{11})$ | $(f_{12}) \wedge (f_{13}) \rightarrow (f_7)$ | |
| | | | $(f_{14}) \rightarrow (f_{13})$ | |
| | $(f_7)$: F | $(f_{12})$ | $(f_{15}) \rightarrow (f_{14})$ | |
| | ($\Diamond$ H) | $(f_{13})$ | $(f_{15})$ | |
| | $(f_{13})$: H V O ($\Diamond$ H) | $(f_{14})$ | | |
| | $(f_{14})$: H | $(f_{15})$ | $(f_{16}) \rightarrow (f_{14})$ | |
| | O ($\Diamond$ H) | $(f_{16})$ | | |
| E3 | F $\wedge$ $\Diamond$ H | $(f_{17})$ | | |
| | $(f_{11})$ $\Diamond$ H | $(f_{18})$ | $(f_{18}) \rightarrow (f_{11})$ | |
| | $(f_{18})$: H V O ($\Diamond$ H) | $(f_{19})$ | $(f_{19}) \rightarrow (f_{20})$ | |
| | $(f_{19})$: H | $(f_{20})$ | $(f_{20}) \rightarrow (f_{19})$ | |
| | | | $(f_{20}) \rightarrow$ FALSE | |
| | O ($\Diamond$ H) | $(f_{21})$ | $(f_{21}) \rightarrow (f_{19})$ | |
| | | | $(f_{22}) \rightarrow (f_{16})$ | |
| | $(f_{16})$: ($\Diamond$ H) | $(f_{22})$ | $(f_{23}) \rightarrow (f_{22})$ | |
| | $(f_{22})$: H V O ($\Diamond$ H) | $(f_{23})$ | $(f_{24}) \rightarrow (f_{23})$ | |
| | $(f_{23})$: H | $(f_{24})$ | $(f_{24}) \rightarrow$ FALSE | |
| | | | $(f_{25}) \rightarrow (f_{23})$ | |
| | O ($\Diamond$ H) | $(f_{25})$ | $(f_{25}) \rightarrow$ FALSE | |
| | | | $(f_{26}) \rightarrow$ FALSE | |
| | $(f_{17})$: F | $(f_{26})$ | $(f_{26}) \wedge (f_{27}) \rightarrow (f_{17})$ | |
| | $\Diamond$ H | $(f_{27})$ | $(f_{28}) \rightarrow (f_{27})$ | |
| | $(f_{27})$: H V O ($\Diamond$ H) | $(f_{28})$ | $(f_{29}) \rightarrow (f_{28})$ | |
| | $(f_{28})$: H | $(f_{29})$ | $(f_{29}) \rightarrow$ FALSE | |
| | | | $(f_{30}) \rightarrow (f_{28})$ | |
| | | | $(f_{30}) \rightarrow$ FALSE | |
| | O ($\Diamond$ H) | $(f_{30})$ | | |

What is claimed is:

1. A high-performance specification resolution method for use in detecting attacks against computer systems, comprising:
   a) receiving audit conditions to be detected using non-limiting specification formulas expressing fraudulent entry or attack patterns or abnormal operations, to be verified by examining records of a log file of a computer system;
   b) expanding said formulas into subformulas for each record;
   c) scanning and generating, for each expanded formula, Horn clauses to resolve in order to detect whether or not the formula is valid for each record, the Horn clauses expressing implications resolvent of the subformulas for each record scanned in positive clauses having a positive literal and in negative clauses having at least one negative literal;
   d) storing the positive clauses in a stack of subformulas, storing, in a table of clauses, a representation of the negative clauses and the positive clauses;
   storing, in a table of counters, a number of negative literals in each negative clause;
   e) resolving the table of clauses based on each positive clause so as to generate either an output file or an action of the computer system;
   f) iterating steps b) through e) until the scanning of all the records in the log file is complete.

2. The method according to claim 1, wherein temporal logic is used for formulation of the high-performance specification.

3. The method according to claim 1, wherein the table of clauses is a matrix indexed in columns by subscripts of the formulas appearing in the negative clauses, and indexed in lines by subscripts of the formulas appearing in the positive clauses.

4. The method according to claim 1, wherein the table of clauses is a sparse matrix, the columns being represented by chained lists.

5. The method according to claim 1, further comprising optimizing the expansion of the formulas using a hash table to ensure that a formula is not expanded more than once in each record.

6. The method according to claim 2, further comprising optimizing the expansion of the formulas using a hash table to ensure that a formula is not expanded more than once in each record.

7. The method according to claim 1, wherein the log file is scanned only once from beginning to end.

8. A computer system comprising:
   storage means; and
   a processor, coupled to the storage means, for executing programs implementing a high performance resolution method for detecting attacks against the system wherein the processor operates to:
   a) receive audit conditions to be detected using non-limiting specification formulas expressing fraudulent entry or attack patterns or abnormal operations, to be verified by examining the records of a log file;
   b) expand said formulas into subformulas for each record;
   c) scan and generate, for each expanded formula, Horn clauses to resolve in order to detect whether or not the formula is valid for each record, the Horn clauses expressing implications resolvent of the subformulas for each record scanned in positive clauses having a positive literal, and in negative clauses having at least one negative literal;
   d) store the positive clauses in a stack of subformulas, store, in a table of clauses, a representation of the negative clauses and the positive clauses,
   store, in a table of counters, a number of negative literals in each negative clause; and
   e) resolve the table of clauses based on each positive clause, so as to generate either an output file or an action of the computer system.

9. The computer system according to claim 8 wherein temporal logic is used for formulation of the high-performance resolution method.

10. The computer system according to claim 8, wherein the table of clauses is a matrix indexed in columns by subscripts of the formulas appearing in the negative clauses, and in lines by subscripts of the formulas appearing in the positive clauses.

11. The computer system according to claim 8, wherein the table is a sparse matrix, the columns being represented by chained lists.

12. The computer system according to claim 8 including a hash table to ensure that a formula is not expanded more than once in each record.

13. The computer system according to claim 9 including a hash table to ensure that a formula is not expanded more than once in each record.

14. The computer system according to claim 8 including means for scanning the log file only once from beginning to end.

15. The computer system according to claim 8, wherein the programs executed by the processor include:

an adaptor module for translating information from the log file;

an interpreter module for receiving the information from the adapter, receiving the specification formulas, expanding the specification formulas, and filling in the table of clauses, table of counters and the stack of subformulas stored in the storage means; and a clause processing module for resolving the Horn clauses using the information from the table of clauses, the table of counters and the stack of worked subformulas, the clause processor generating the output file or generating the action.

* * * * *